United States Patent [19]

Burkhardt, Jr. et al.

[11] Patent Number: 4,866,664
[45] Date of Patent: Sep. 12, 1989

[54] INTERCOMPUTER COMMUNICATION CONTROL APPARATUS & METHOD

[75] Inventors: Kenneth J. Burkhardt, Jr., Quakertown; Jay L. Gerbehy, Califon; Theodore J. Skapinetz; Patrice M. A. Bremond-Gregoire, both of Sommerville, all of N.J.

[73] Assignee: Unisys Corporation, Blue Bell, Pa.

[21] Appl. No.: 23,316

[22] Filed: Mar. 9, 1987

[51] Int. Cl.[4] ............... G06F 13/38; G06F 15/16
[52] U.S. Cl. ................. 364/900; 364/931.4; 364/940; 364/942.3
[58] Field of Search ... 364/900 MS File, 200 MS File

[56] References Cited

U.S. PATENT DOCUMENTS

| | | | |
|---|---|---|---|
| 4,025,905 | 5/1977 | Gorgens | 364/900 |
| 4,319,338 | 3/1982 | Grudowski et al. | 364/900 |
| 4,365,294 | 12/1982 | Stokken | |
| 4,502,120 | 2/1985 | Ohnishi et al. | 364/405 |
| 4,539,655 | 9/1985 | Trussell et al. | 364/900 |
| 4,608,700 | 8/1986 | Kirtley, Jr. et al. | 375/36 |

OTHER PUBLICATIONS

Bitner, D. P., "Inter-Processor Communication in a Distributed Processing System—GTD-5-EAX", in: First Annual Phoenix Conference on Computers and Communications, 1982 Conference Proceedings, (New York, IEEE, May 1982), pp. 263-266.

Rap, M. D. (et al.), "MicroStandards P1296: The Interprocessor Communication Standard", IEEE Micro, vol. 6, No. 3, (Jun. 1986), pp. 72-77.

Primary Examiner—Eddie P. Chan
Assistant Examiner—Maria Napiorkowski
Attorney, Agent, or Firm—Albert B. Cooper; Mark T. Starr; Robert S. Bramson

[57] ABSTRACT

Interprocessor message communication synchronization apparatus and method for a plurality of processors connected to a system bus where one processor desiring to send a control signal to another processor, broadcasts an input/output write instruction on the system bus along with the address of the receiving processor and a data field representative of the control signal to be transmitted. Apparatus associated with the receiving processor includes a decoder that responds to the input-/output write instruction to enable a register when the address transmitted on the bus matches its address. The enabled register receives the data signals from the bus to set therein the appropriate control signal represented by the data. The stages of the register are connected to the associated control signal inputs of the other processor. In this manner the one processor may transmit a message synchronizing interrupt to the other processor.

13 Claims, 5 Drawing Sheets

INTERCOMPUTER COMMUNICATION CONTROL APPARATUS & METHOD

BACKGROUND OF THE INVENTION

1. FIELD OF THE INVENTION

The invention relates to intercomputer message communication synchronization protocol particularly with respect to the implementation of an interface module for coupling a work station to a local area network (LAN).

2. DESCRIPTION OF THE PRIOR ART

Intelligent work stations, such as the B25 family of universal work stations, manufactured by Unisys Corporation (formerly Burroughs Corporation) are becoming ubiquitous in present day office environments. As the number of work stations in the office environment continues to increase, the requirement for efficient mechanisms for communicating between the work stations has also increased. Local area network (LAN) technology has emerged as a potential solution to the problems associated with connecting large numbers of work stations and peripherals via a relatively high speed data path. One of the limitations to the widespread use of LANS has been the cost associated with connecting a work station to a LAN. Such interconnect cost may be as high as $500-$1000 per work station which expense is often unjustified in the office environment.

One solution to the high interconnect cost of LANS in the office environment has been the utilization of a simple, high speed master/slave cluster protocol for effecting inter work station communication. The primary advantage of the cluster approach is the relatively low interconnect cost. The major problem with clustering, however, is that as the number of work stations increases, performance decreases primarily because of the overhead at the master work station assigned the task of managing the cluster. Replacing the master work station with a super-minicomputer may increase the number of work stations supported, but eventually this configuration will suffer from the disadvantages associated with a logical star configuration. In such configurations failure of the cluster or star master work station can result in failure of the entire interconnected network. Additionally the master work station in such configurations is limited to the number of slave work stations that it can support.

Although, as described above, large numbers of peer work stations may be interconnected via a LAN, the interconnect cost per work station is excessive. Additionally when endeavoring to connect a work station to a high speed LAN, the high data transfer rates of the LAN tend to usurp the processing time of the work station processor to the extent that the processor may not have sufficient time remaining to perform required processing tasks. The processor may only have time to service the LAN. This problem is exacerbated if it is desired to connect a plurality of clustered work stations to a LAN. The cluster master work station, which would be connected to the LAN, would be unable to manage the cluster, perform its own processing tasks and service the LAN. A solution to the interconnect problem may be to provide an additional processor in the master work station to serve as a gateway between the master work station and the LAN. The additional processor would preferably operate asynchronously with respect to the master work station processor. Present day message synchronization and control protcols for message transmission between loosely coupled processors are not sufficiently efficient to service a high speed LAN without overloading the message transmission capability between the processors. Interrupt signals transmitted between the processors on an interprocessor bus are often utilized to effect interprocessor synchronization. This arrangement suffers from the disadvantage that large numbers of bus conductors are required, dedicated, respectively, to the various synchronization interrupts as well as to the specific processor interconnections. This disadvantage is exacerbated for configurations having significant numbers of processors connected to the bus.

SUMMARY OF THE INVENTION

The invention involves apparatus and method of controlling and synchronizing the transmission of messages between asynchronously operating or loosely coupled computers. The invention is utilized in a LAN interface module that operates to connect a cluster master work station to a LAN thus functioning as a gateway between a local cluster and the LAN. The LAN interface module obviates the above described cost and performance problems associated with interconnecting large numbers of work stations. Preferably the LAN interface module connects to and communicates with the master work station via the work station system bus. In accordance with the invention when a first processor has a message to be transmitted to a second processor across the system bus the first processor issues an input-/output (I/O) instruction having an address associated with a message synchronizing interrupt address for the second processor. Means responsive to the I/O instruction generates an interrupt signal for the second processor in accordance with the address. The second processor in response to the interrupt signal recognizes and acquires the pending message. The second processor replies by transmitting an input/output instruction having an address corresponding to an interrupt signal of the first processor. Means responsive to the input/output instruction generates a corresponding interrupt signal to the first processor confirming and synchronizing the message transmission process. This procedure is utilized in transmitting any discrete signal; e.g., an interrupt or other control signal, such as Reset, between processors.

DESCRIPTION OF THE PREFERRED EMBODIMENT

Figure 1:
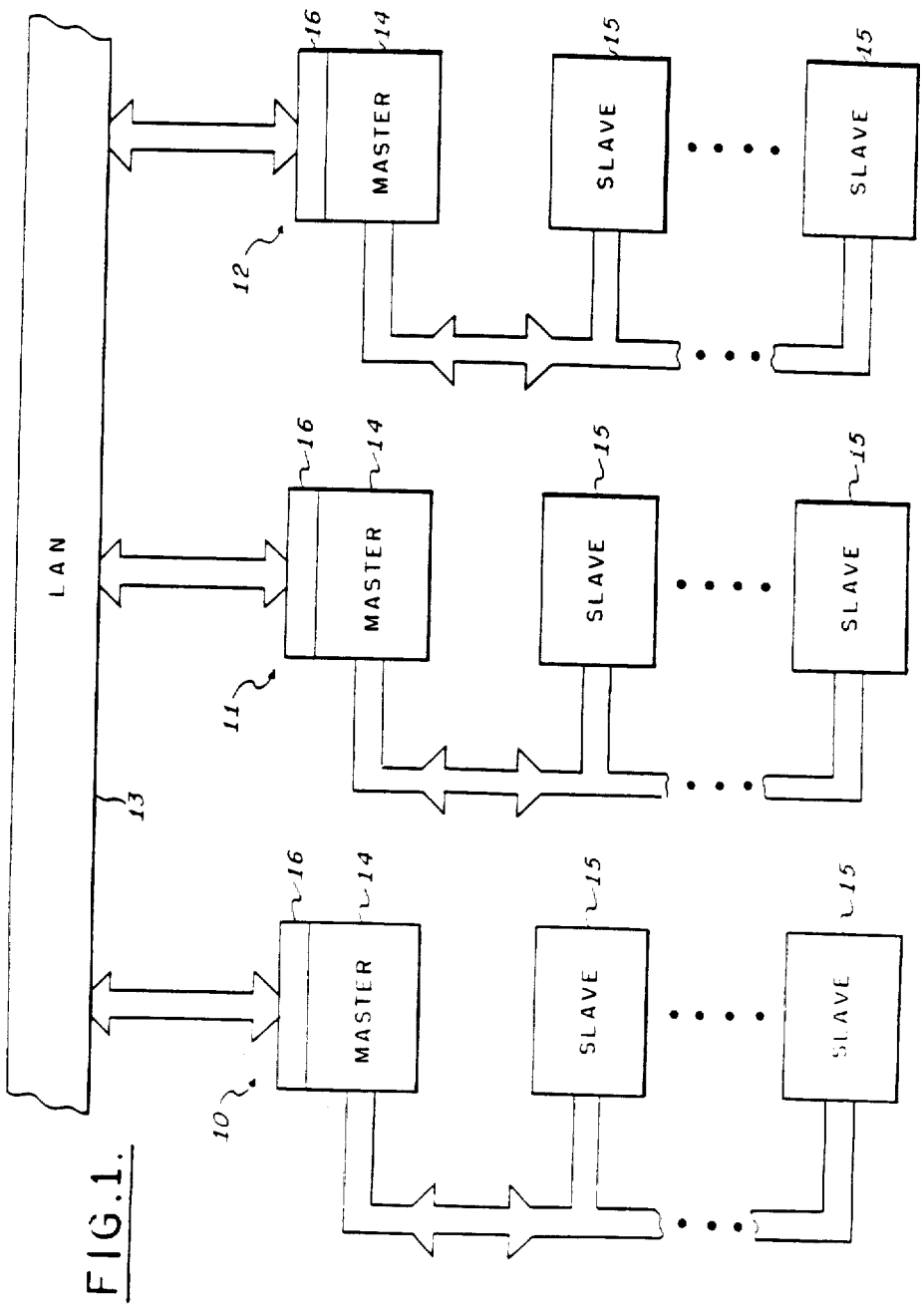
FIG. 1 is a schematic block diagram of plural clustered work stations where each cluster is connected to a LAN via a LAN interface module in accordance with the invention.

Referring to FIG. 1 a typical system topology of clustered work stations communicating via a LAN is depicted. The system of FIG. 1 illustrates three work station clusters 10, 11, and 12 each connected locally via cluster communications and globally via a LAN 13. The LAN 13 may, for example, comprise an 802.3 10 MB CSMA/CD LAN. Each of the clusters 10, 11, and 12 is comprised of a master work station 14 coupled to one or more slave work stations 15 via cluster communications. Each of the clusters 10, 11, and 12 is connected to the LAN 13 via a LAN interface module 16. In the Unisys Corporation B25 family of universal work stations utilizing modular construction, the LAN interface module 16 is connected physically adjacent the other modules of the master work station 14 and couples electrically thereto via the system or work station bus internal to the master work station 14.

Logically any of the slave work stations 15 connected to a master 14 with a LAN interface module 16 can communicate over the LAN 13. The actual physical data path, however, is through each of the cluster masters 14. LAN messages can originate in any work station. The actual transmission of messages from the transport layer and below is controlled by a processor and the circuitry in the LAN module 16. Higher levels of the protocol are the responsibility of the main processor within each of the work stations. The main processor in each of the master work stations 14 and each of the slave work stations 15 is, for example, an 80186 class microprocessor with appropriate memory and support logic as well as circuitry for interfacing the 80186 to the other sections of the work station. The message communication synchronization of the present invention is utilized in the system of FIG. 1 in synchronizing message transmission between the main processor of the master work station 14 and an auxilary processor in the LAN interface module 16 in a manner to be described.

Figure 2:
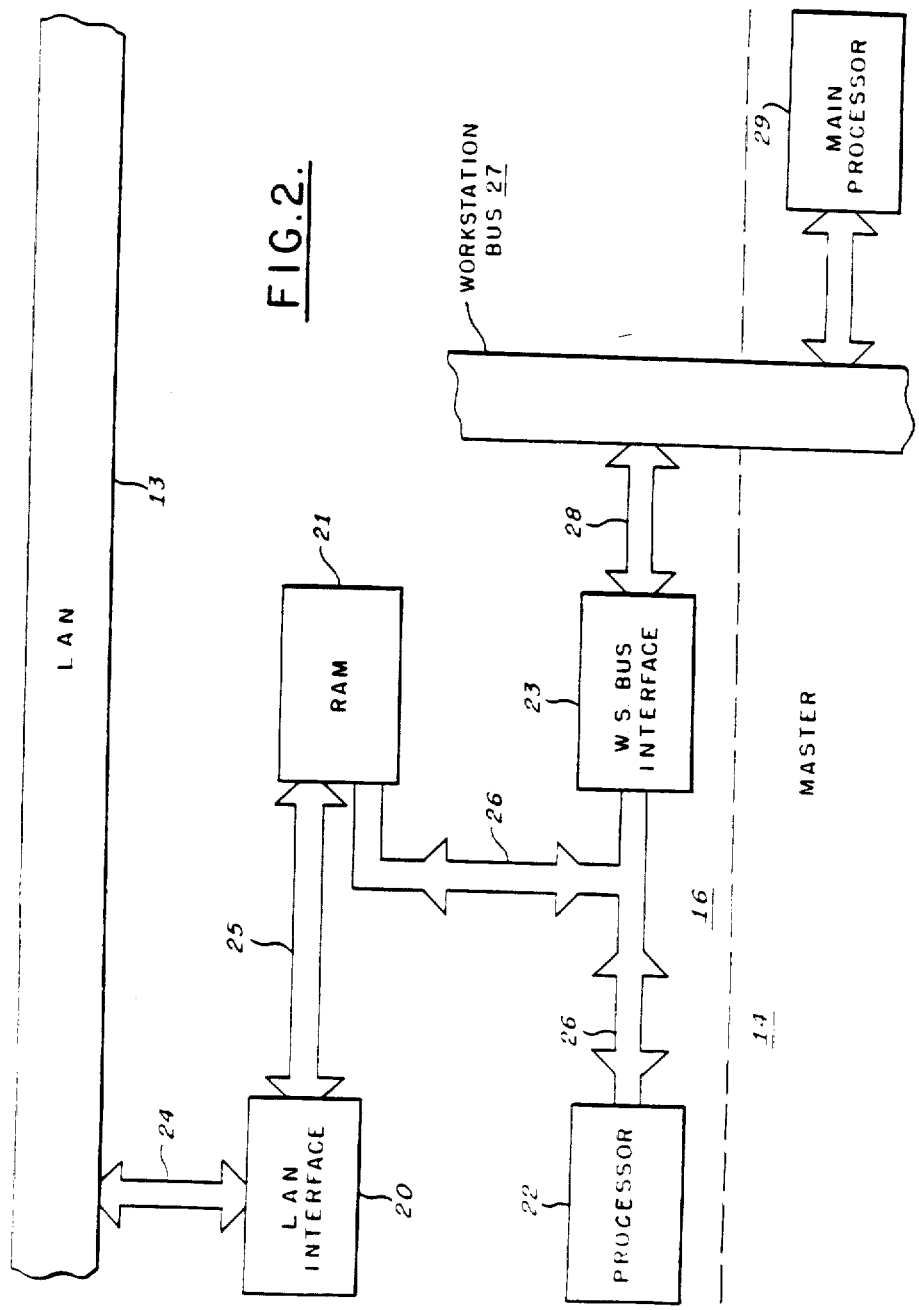
FIG. 2 is a schematic block diagram of details of the LAN interface module of FIG. 1.

Referring to FIG. 2, in which like reference numerals indicate like components with respect to FIG. 1, a schematic block diagram of the sections of the LAN interface module 16 is illustrated. The LAN interface module 16 comprises four sections of logic; viz, a LAN interface section 20, a RAM section 21, a processor section 22, (auxilliary processor) and a work station bus interface section 23.

The LAN interface section 20 couples to the LAN 13 in a conventional manner utilizing a standard bus schematically depicted at 24. When the LAN 13 is an 802.3 standard, the LAN interface section 20 is comprised of industry standard VLSI chips for connecting to the 802.3 LAN. The VLSI components may, for example, include an intel 82586 LAN co-processor, a Seeq 8002 Manchester Encoder and a National Semiconductor 8392 integrated transceiver. The transceiver is coupled to the LAN 13 for two way communication therebetween via the bus 24. The transceiver communicates information from the LAN 13 to the 82586 co-processor. The co-processor communicates with the LAN 13 via the Manchester Encoder and the transceiver. The co-processor in the LAN interface section 20 communicates with the RAM 21 via a bus 25. The RAM 21 is a dual ported RAM with the bus 25 connected to one of the ports thereof.

The LAN interface section 20 operates in parallel with respect to the processor section 22 and the work station bus interface section 23. Communications between the 82586 co-processor of the LAN interface section 20 and the processor section 22 as well as the bus interface section 23 are via buffers in the dual ported RAM section 21. All commands and data to and from the co-processor are transmitted directly through the RAM section 21. Thus once initialized, the 82586 co-processor in the LAN interface section 20 and the processor section 22 operate completely in parallel and messages can be received or transmitted on the LAN 13 regardless of whether or not the processor section 22 is busy.

The RAM section 21, comprising a conventional dual ported RAM and standard support circuitry, has one port thereof coupled to the LAN interface section 20 via the bus 25 and the second port thereof coupled to the processor 22 and the work station bus interface section 23 via a bus 26. Dual ported memory is utilized in the LAN interface module 16 to support simultaneous access to memory by the processor section 22 and the LAN interface section 20. The LAN interface module 16 therefore has the capability to simultaneously receive and process messages from the LAN 13. The RAM 21 is designed with a fairly large capacity to support buffering of a large number of messages in situations where the main processor in the master work station 14 is busy handling other tasks. The design parameters are selected so that no messages from the LAN 13 are missed because of lack of response from the main processor.

The processor section 22 comprises an 80186 class microprocessor with the required memory chips, support logic and buffers for operating and interfacing the 80186 in the processor section 22 with respect to the other sections of the LAN interface module 16. In the system described herein ROM capabilities of the processor section 22 are limited because operational software is downloaded from the main processor of the master work station 14. The processor section 22 is connected for two way information flow to both the RAM section 21 at one of the ports thereof and to the work station bus interface section 23 via the bus 26.

The work station bus interface section 23 receives information from the processor section 22 and the RAM section 21 via the bus 26 and couples to a work station system internal interconnection bus 27 via a bus 28. The internal work station bus 27 couples to the main processor 29 in the master work station 14. The work station bus interface section 23 contains the logic necessary to interface the LAN module 16 to the main processor of the master work station 14 via the internal interconnection bus 27. The work station bus interface section 23 contains apparatus utilized in the transmission of data as well as in the synchronization of the data communication in a manner to be described.

Figure 3:
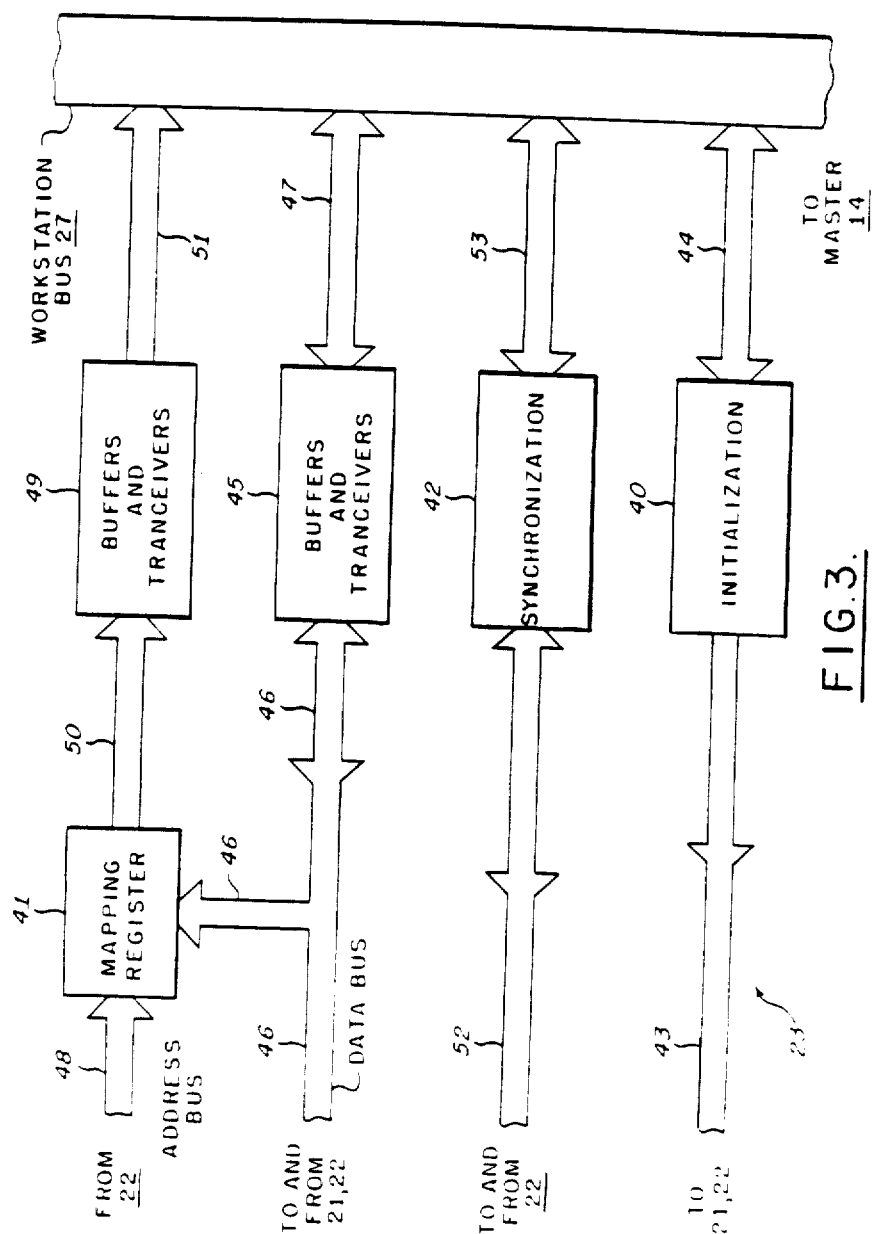
FIG. 3 is a schematic block diagram of the bus interface logic of the module of FIG. 2.

Referring to FIG. 3, in which like reference numerals indicate like components with respect to FIGS. 1 and 2, details of the work station bus interface section 23 of the LAN interface module 16 are illustrated. The work station bus interface section 23 comprises four blocks of logic; viz, module initialization logic 40, memory address mapping register logic 41, multiprocessor synchronization logic 42, and various buffers and transceivers for controlling the movement of data between the LAN interface module 16 and the work station system interconnection bus 27.

The initialization logic 40 communicates with the processor section 22 and the RAM section 21 of the LAN interface module 16 via a bus 43 and with the work station bus 27 via a bus 44. The initialization logic 40 contains conventional hardware that is utilized during start up of the system to set various components thereof into an initial state. The initialization logic 40 also contains standard hardware required to support the soft address protocol of the work station system. When power is applied to the unit, the initialization logic 40 returns a device identification code to the main processor in the master work station 14 via the work station bus 27 and, in response thereto, the main processor defines the addresses to which the LAN interface module 16 will respond. The initialization logic 40 includes the logic required to recognize the soft device addresses sent down from the main processor and to convey these addresses to the module 16 via the bus 43.

Buffers and transceivers 45 are included for controlling the movement of data to and from the processor section 22 and the RAM section 21 of the LAN interface module 16 via a data bus 46. The buffers and transceivers 45 communicate the data to and from the work station bus 27 via a bus 47.

The memory address mapping register logic 41 is a combination of an adder and latches utilized to map local internal memory addresses of the module 16 to the memory address space of the intermodule system bus 27 for transmitting messages and data to other modules located in the master work station 14. Addresses eminating from the processor section 22 are applied to the mapping register logic 41 via an address bus 48 for mapping onto the system address bus. The data bus 46 provides an input to the mapping register logic 41 for loading initial conditions for the address mapping operation. Appropriate buffers and transceivers 49 are included to control the transmission of the mapped addresses via buses 50 and 51 to the work station bus 27.

The multiprocessor synchronization logic 42 communicates with the processor section 22 via a bus 52 and with the work station bus 27 via a bus 53. The synchronization logic 42 is utilized in the synchronization of data transfers across the work station internal bus 27 and the synchronization of communications between the processor section 22 and the main processor of the master work station 14. It is appreciated that the address bus 48, data bus 46 and buses 43 and 52 comprise the bus 26 of FIG. 2. Similarly the bus 28 of FIG. 2 is comprised of the buses 44, 47, 51, and 53. Thus communications between the processor 22 in the LAN module 16 and other processor's connected to the work station bus 27, such as the main processor in the master work station 14, are controlled by the interprocessor synchronization logic 42. The logic 42 supports the generation of a hardware reset of the LAN module 16, a nonmaskable interrupt (NMI) at the LAN module 16 and several interrupt requests, for message communication synchronization, at both the LAN module 16 and the main processor in the master work station 14, in a manner to be explained. Details of the synchronization logic 42 will be described with respect to FIGS. 4 and 5.

Figure 4:
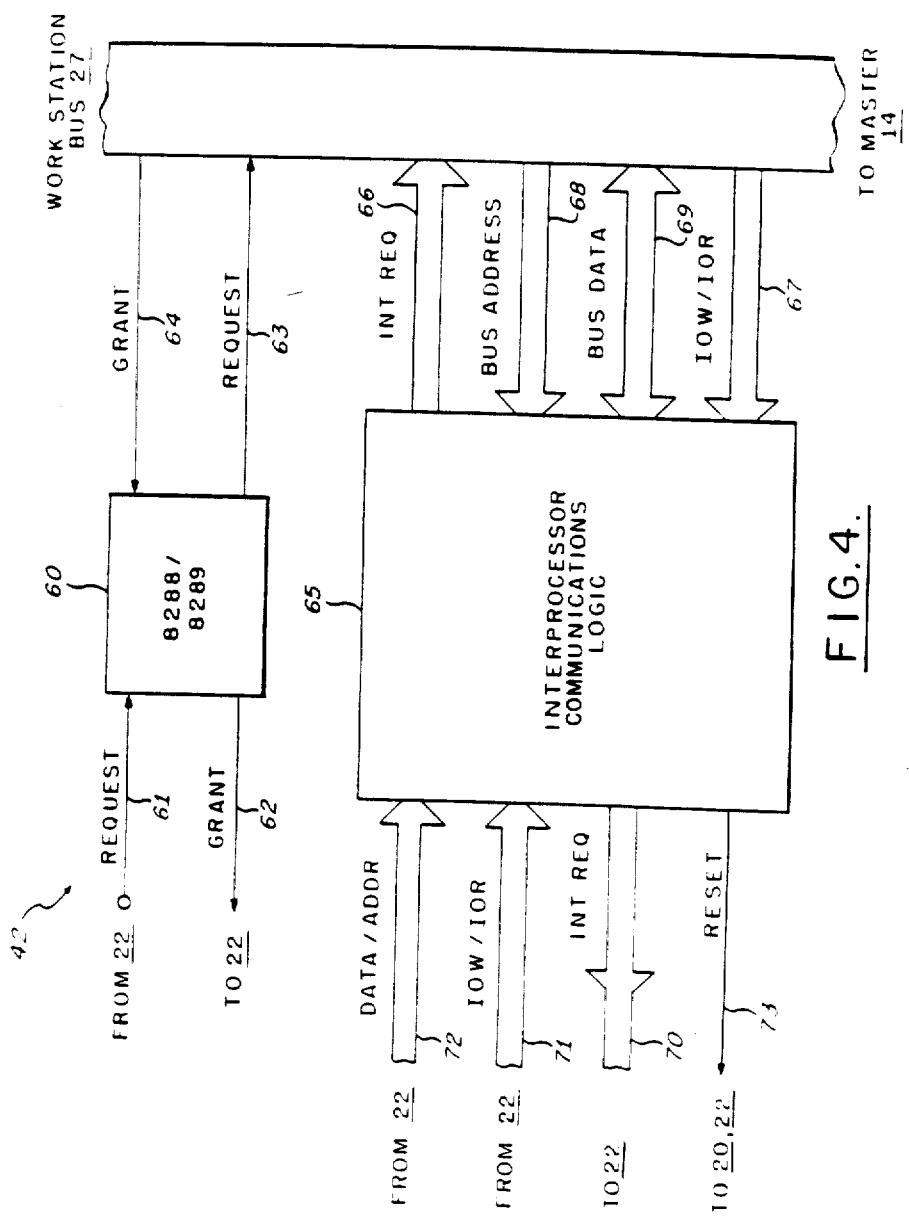
FIG. 4 is a schematic block diagram of the synchronization logic of FIG. 3.

Referring to FIG. 4, in which like reference numerals indicate like components with respect to FIG. 3, a schematic block diagram of the synchronization logic 42 (FIG. 3) is illustrated. The synchronization logic 42 has the capability of synchronizing and controlling message communication among multiple processors connected to the work station system bus 27. Access to the system bus 27 by the processor 22 in the LAN interface module 16 is controlled by a circuit 60 of the Intel 8288/8289 class. The circuit 60 comprises conventional logic to control data transfer across multiple bus systems. The circuit halts instructions or requests that are mapped by the processor 22 to the interconnection bus 27 until the bus has been physically granted to the LAN interface module 16. Specifically the circuit 60 receives a bus request from the processor 22 on a line 61 and acknowledges to the processor 22, by a signal on a line 62, that the bus has been granted. In response to a request signal on the line 61 the circuit 60 provides the request to the bus on a line 63. The circuit 60 receives acknowledgement that the bus has been granted on a line 64.

The LAN interface module 16 (FIG. 2), via the interprocessor communications logic 65, receives three interrupts and transmits three interrupts over the work station system bus 27. In a manner to be described in further detail, interrupt requests to the LAN module 16 are set by issuing an I/O write instruction over the system bus 27 to the base address of the module 16. The same procedure is utilized by the main processor in the master work station 14, or another module connected to the bus 27, to clear the request. Interrupt requests are transmitted over the system bus 27 by locally executing I/O write instructions. These instructions are decoded locally and converted to actual bus requests. Interrupt requests into the module 16 are cleared by local I/O writes. The three interrupts that can be received by the LAN module 16 are NMI, INT 1, and INT 3. INT 1 and INT 3 are interrupt inputs to the processor 22 and are utilized for synchronization of normal message traffic in a manner to be described. The non-maskable interrupt request is utilized for purposes such as bootstrapping the module 16.

The LAN module 16, via the interprocessor communications logic 65, generates an analogus set of interrupt requests; viz, a pseudo NMI line and two general purpose interrupt signals INT 1 and INT 2. The output NMI may be utilized, for example, to inform the main processor in the master work station 14 of any operational problems in the LAN module 16 and INT 1 and INT 2 may be utilized in the synchronization of message transmissions in accordance with the invention.

The status of the interrupt request lines may be monitored by issuing I/O read instructions either locally by the processor 22 or over the system bus 27 from the main processor in the master work station 14.

The interprocessor communications logic 65 provides the interrupt requests to the main processor in the master work station 14 on a bus 66 which connects to the work station system bus 27. The logic 65 receives the input/output write and input/output read signals as well as bus address signals and bus data signals from the work station bus 27 via buses 67, 68, and 69 respectively. The interrupt request to the local processor 22 from the logic 65 are provided on a bus 70. The I/O write and read instructions as well as data and address signals from the local processor 22 are provided to the logic 65 on buses 71 and 72 respectively. The logic 65 provides an initialization reset command to the LAN interface section 20 and the processor section 22 of the LAN module 16 via a reset line 73. It is appreciated that the buses and lines 61, 62, and 70-73 comprise the bus 52 of FIG. 3. It is further appreciated that the buses and lines 63, 64, and 66-69 comprise the bus 53 of FIG. 3.

Figure 5:
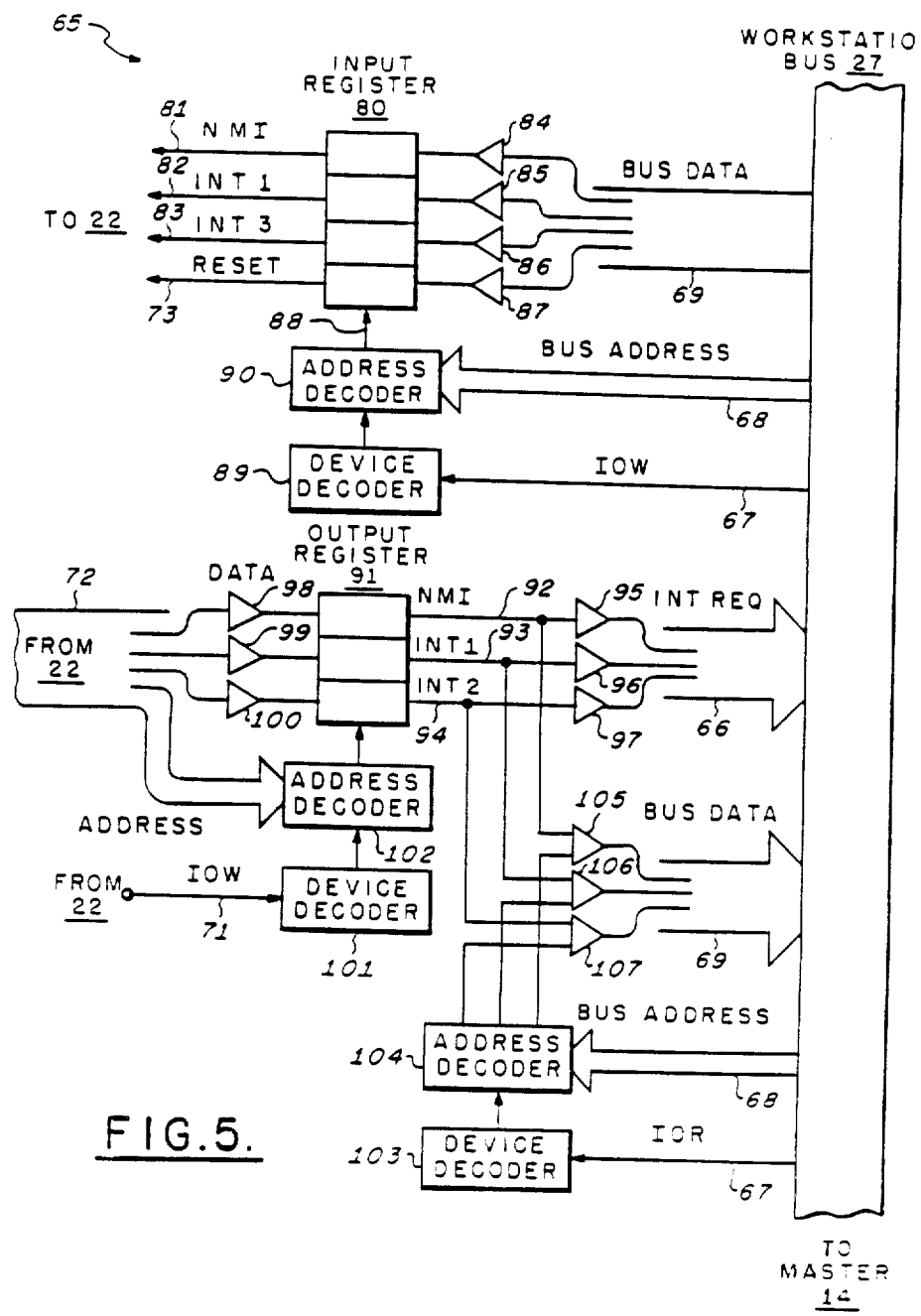
FIG. 5 is a detailed schematic block diagram of the synchronization logic of FIG. 4 implemented in accordance with the invention.

Referring to FIG. 5, in which like reference numerals indicate like components with respect to FIG. 4, details of the interprocessor communications logic 65 are illustrated. The logic 65 includes an input register 80 comprising a plurality of stages for storing the respective plurality of discrete control signals to be sent to the processor 22. As described above, the control signals include the non-maskable interrupt request on a line 81, the INT 1 request on a line 82, the INT 3 request on a line 83 and the Reset request on the line 73. It is appreciated that the lines 81-83 correspond to the bus 70 of FIG. 4. The interrupt requests and the reset request are set into the register 80 by connections to the associated respective data lines on the work station bus 27 via the data bus 69 through respective drivers 84–87. The discrete data signals provided by the drivers 84–87 are set into the register 80 in response to a register enabling signal on a line 88. An I/O write instruction broadcast by the main processor in the master work station 14 on the work station bus 27 is applied on the IOW line 67 to a device decoder 89 which responds thereto. When an I/O write instruction is broadcast, the device decoder 89 enables an address decoder 90. If the address sent down the bus 27 and received at the address bus 68 is the address assigned to the input register 80, the address decoder 90 enables the input register 80 via the line 88.

Thus when the main processor in the master work station 14 desires to send a discrete control signal, such as a message synchronizing interrupt or Reset, to the processor 22, the main processor broadcasts an I/O write instruction on the bus 27, the instruction including the address to which the address decoder 90 is responsive as well as data set to the desired control signal. When the device decoder 89 detects the broadcast I/O write instruction and the address decoder 90 is enable by the appropriate bus address, the input register 80 is enable to receive the data which sets in the desired discrete control signal.

It is appreciated that the main processor may broadcast the I/O write instruction by enabling a line on the bus 27 dedicated to I/O write. Alternatively the main processor may broadcast, on plural lines, the operation code for the instruction. INT 1 and INT 3 may be utilized for the message synchronizing interrupts required by the communications protocol. The Reset control discrete is provided to the processor 22 on the line 73 in the same manner as the message synchronizing interrupts. The message synchronizing interrupts may be of the type where the main processor requests the attention of the auxiliary processor 22 to transmit a message thereto or acknowledges to the auxiliary processor 22 that a message has been received therefrom.

The interprocessor communications logic 65 also includes an output register 91 utilized in sending control discretes, such as interrupts, from the auxiliary processor 22 to the main processor in the master work station 14 over the bus 27. The output register 91 provides discrete control signals NMI on a line 92, INT 1 on a line 93 and INT 2 on line 94. As described above the interrupt signals INT 1 and INT 2 are interrupt inputs recognized by the main processor in the master work station 14 as message synchronizing interrupts. These interrupts are not necessarily the same as the interrupt signals provided by the input register 80 and hence are differently designated. The interrupt signals on the lines 92, 93, and 94 are transmitted to respective lines of the work station bus 27 dedicated to these interrupts and connected to the associated interrupt inputs of the main processor. The interrupt signals on the lines 92, 93, and 94 are transmitted to the corresponding lines of the work station bus 27 by respective drivers 95, 96, and 97 and the interrupt request bus 66. The data for setting the interrupts into the register 91 are provided as part of an I/O write instruction from the processor 22 transmitted over the local bus 72. The data from the bus 72 are inserted into the stages of the register 91 via respective drivers 98, 99 and 100. When the auxillary processor 22 desires to send NMI, INT 1 or INT 2 to the main processor, the processor 22 issues an IOW command on the line 71 which enables a device decoder 101 responsive thereto. In response to the I/O write command the device decoder 101 enables an address decoder 102 responsive to the address signal on the bus 72 from the auxiliary processor 22. When the auxillary processor 22 desires to communicate with the output register 91, the I/O write instruction transmitted on the bus 72 contains the address to which the address decoder 102 responds. When the address decoder 102 is energized, the output register 91 is enabled to receive the interrupt data sent with the I/O write instruction on the bus 72.

The interprocessor communications logic 65 is resident in one of the LAN interface modules of the system that includes the auxillary processor 22. Additional auxillary processors in, for example other LAN interface modules, may also be connected to the work station bus 27. Since the interrupt lines on the work station bus 27 connected to the main processor in the master work station 14 are unique, any one of the interprocessor communications logic blocks, such as the one illustrated in FIG. 5, may provide the interrupt NMI, INT 1 or INT 2 back to the main processor. A device decoder 103 and an address decoder 104 are included in the logic 65 to permit the main processor to determine from which auxillary processor the interrupt was transmitted. When the main processor receives an interrupt on the work station bus 27, the main processor polls the auxillary processors by broadcasting I/O read instructions containing the addresses of the various output registers. When the device decoder 103 receives the I/O read instruction via the line 67, the decoder 103 enables the address decoder 104. When the address decoder 104 receives the address to which is it programmed to respond, transmitted from the main processor as part of the I/O read instructions on the address bus 68, the address decoder 104 enables drivers 105, 106, and 107. When the drivers 105, 106, and 107 are enabled, the data on the lines 92, 93, and 94 are transmitted to the main processor on the data lines of the work station bus 27 via the data bus 69. The main processor can then examine the interrupt signals from the output register 91 to determine if one of them has been set. In this manner the main processor determines the auxillary processor 22 that originated the interrupt.

In operation when the auxiliary processor 22 desires to send a message synchronizing interrupt to the main processor, the auxiliary processor 22 generates an I/O write instruction containing the address to which the address decoder 102 responds and the interrupt data to be set into the output register 91. The processor 22 places the I/O instruction on the local bus 26 (FIG. 2) which contains the data/address bus 72 and the I/O write instruction line 71. In response to the I/O write instruction generated by the processor 22, the interrupt to be transmitted to the main processor is set into the output register 91. The interrupt is received by the main processor over the work station bus 27 and the source of the interrupt is identified by the main processor by polling the address decoders 104 by an I/O read instruction. The non-maskable interrupt on the line 92 is utilized primarily to notify the main processor of a failure in the auxillary processor. The interrupt 1 and interrupt 2 signals on the lines 93 and 94 are utilized for normal messaging in the manner described above with respect to the interrupt 1 and interrupt 3 signals on the lines 82 and 83 from the input register 80. For example the auxillary processor may want to inform the main processor that it has completed a task.

Although the invention has been described in terms of an I/O instruction containing an address field designating the target device and a data field designating the particular control discrete to be transmitted, it is appreciated that the address together with the data signal may be considered as an address designating the particular control input port to which the communication is directed. For example if the main processor desires to reset the auxillary processor 22, the main processor broadcasts an I/O write instruction containing an address field that designates the processor 22 as the target and a data field that designates the reset signal. The combination of the address field and the data field may be considered as the address of the reset input to the processor 22.

The above described message synchronization protocol may be utilized in higher level message communication protocols. Data movement may be controlled by providing the processor in control of the bus with the ability to control the movement of data by placing addresses and data on the bus and routing the data to common memory accessible to all processors connected to the bus. Data flow synchronization may be controlled at two levels. At the bus level, access to the bus and the common memory is controlled by higher level system bus arbitration logic and by a common memory controller. At a lower level the movement of messages by different processors is synchronized by providing each processor with the ability to receive and transmit synchronization interrupts over the system bus in the manner described above.

In a conventional manner each of the processors is run by an operating system that controls the performance of various processes. When a process requires a function to be performed by the operating system, it submits a request to the operating system which in turn routes the request to the process capable of serving it. Once the requested function has been completed, the process that has performed the function sends a response back to the originating process to inform it that the operation has been completed. It is appreciated that with this mechanization, the process capable of responding to the request does not have to be resident on the processor that issues the request as long as there is sufficient intelligence within the operating system resident on the processor to route the request.

In the case of multiple masters (a processor in control of the bus) on the same system bus, each processor has two processes (designated as agents) that are responsible for routing messages between processors, the Interprocessor communication (IPC) client and the IPC server. The function of the client agent is to receive requests from processes running on the same processor and to route them to the server agent of the processor where the function is to be performed. The client agent also has the reponsibility of returning a response back to the requesting process after the response has been received from the selected processor. The IPC server agent responds to requests by other processors and routes them to the correct processes of the local operating system. It also receives the responses from the local operating system and routes them back to the appropriate IPC client.

A mailbox mechanism is utilized for physically transmitting messages. Each processor on the system bus is assigned two mailboxes (one for the client agent and one for the server agent) at a predefined address in memory accessible to all of the processors. When a processor is ready to transmit a message, the following operations occur.

(1) The client agent wishing to transmit a request to a different processor writes an abbreviated form of the message into its mailbox, specifies the desired processor in an addressee field of its mailbox and then generates an interrupt request to the appropriate server agent by issuing an I/O write command to the address of the attention signal for the appropriate processor. In the case of the LAN interface module 16, the interprocessor communications logic 65 recognizes the appropriate I/O instructions on the system bus for requests coming in and generates the specific interrupts going out for the main processor, as described above.

(2) The server agent at the receiver processor determines that it has a request pending by servicing the interrupt request and then scanning all of the mailboxes to determine the source of the request.

(3) If the memory of the requesting processor is accessible to the system bus 27, the server will copy the request into the memory space of its processor and release the mailbox entry by clearing the address field.

If the memory of the requesting processor is not accessible to the system bus, the server agent will allocate memory in the common memory area and send a message to the client agent of the requesting processor asking it to copy the message to common memory before proceeding.

(4) After the full request has been copied to local (or common) memory, control is passed to the appropriate local process for servicing the request.

(5) Once the local process has serviced the request, control is returned to the server agent and if necessary the results of the request are copied to the memory of the requesting processor (either directly if accessible to the system bus 27, or indirectly via the client agent if memory is not accessible to the system bus 27).

(6) The server agent then creates a response message in its mailbox and sends an interrupt to the requesting agent informing it that the requested operation has been completed.

For the above described communications protocol to operate correctly several rules should be followed in implementing client and server agents as follows.

(1) Processors equipped with memories accessible to the system bus 27 cannot write into memory space when that space is open to access from another processor. For example, once a processor puts a message in a mailbox and assigns a valid addressee code, it cannot modify the contents of the mailbox until the addressee field has been cleared.

(2) Processors must copy and clear mailbox information as quickly as possible to avoid tying up communications paths.

The above described communications protocol is relatively simple, compared to prior art communications protocols, which facilitates implementation and testing. The communications protocol provides the system with many of the advantages associated with both loosely coupled and tightly coupled multiprocessor systems.

The system exhibits performance normally associated with tightly coupled systems because the time required to transmit messages is relatively short since message are passed at memory speeds. The processor independence, however, of a loosely coupled system is retained since each processor runs its own operating system and must only communicate with another processor to access resources not available locally. It is appreciated that the main processor in the master work station 14 and the processor 22 in the LAN interface module 16 run completely difference operating systems.

The protocol of the present invention has been described in the implementation of an intelligent LAN interface module. It is appreciated that the protocol may also be utilized to readily implement other intelligent modules, such as an intelligent data communications module. There is no logical limit to the number of intelligent modules that can be connected to the main processor in the master work station 14 via the work station bus 27. The message synchronization protocol of the present invention offers advantages over the prior art in that it significantly reduces the number of direct interrupt lines on the system bus that would otherwise be required. Generally it would be impractical to provide direct interrupt communication between all processors sharing a system bus in a multiprocessor system. It is appreciated that the architecture described above is extensible so as to support multiple processors interconnected by a system bus.

The present invention provides an efficient mechanism for extending the capabilities of a processor to permit it to reside on a local high speed bus with other processors and for these processors to communicate with one another in an efficient manner by means of message communication and synchronization. The invention implements an efficient message passing system in a multiprocessor environment. The present invention may be utilized for communication between a main processor and plural auxiliary processors or between the auxiliary processors themselves.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. Apparatus for transmitting a plurality of control signals from a first digital processor to a second digital processor, said second digital processor having an address associated therewith and a plurality of control signal inputs corresponding to said plurality of control signals, respectively, said plurality of control signals including a predetermined control signal, said plurality of control signal inputs including a predetermined control signal input corresponding to said predetermined control signal, comprising:

means in said first processor for generating and transmitting a first type of instruction having an opcode portion, an address portion containing said address of said second processor and a data portion containing a data signal representative of said predetermined control signal, and converting means responsive to said first type of instruction for generating said predetermined control signal for transmission to said predetermined control signal input in response to said instruction, said address portion and said data signal, said first and second processors being coupled to a system bus for communication therebetween, said means in said first processor transmitting said first type of instruction on said system bus, said second processor being coupled to said bus through said converting means, said data portion of said first type of instruction comprising a plurality of bits for designating said plurality of control signals, respectively, said converting means comprising a first register having a plurality of stages coupled to said system bus for receiving said plurality of bits, respectively, of said data portion, and first decoder means coupled to said system bus responsive to said first type of instruction for enabling said first register to store said plurality of bits contained in said data portion when said first processor transmits said first type of instruction having said opcode portion designating said first type of instruction and said address portion containing said address of said second processor, said stages of said first register providing inputs, respectively, to said plurality of control signal inputs of said second processor.

2. The apparatus of claim 1 wherein said first type of instruction comprises an input/ouput write instruction, said plurality of control signals includes at least one interrupt signal, and said plurality of control signal inputs includes at least one interrupt signal input to said second processor corresponding to said interrupt signal.

3. The apparatus of claim 2 in which said converting means further comprises a second register having a plurality of stages.

4. The apparatus of claim 3 in which said second processor includes means for generating and transmitting an input/output write instruction having an address portion containing the address of said second register and a data portion containing a data signal comprising a plurality of bits designating a plurality of further interrupt signals, respectively, said first processor having a plurality of further interrupt signal inputs corresponding thereto.

5. The apparatus of claim 4 in which said converting means includes second decoder means coupled to said second processor and responsive to said input/output write instruction transmitted by said second processor for enabling said second register to store said data signal contained in said data portion of said input/output write instruction transmitted by said second processor when said input/output write instruction is transmitted by said second processor having said address portion containing said address of said second register, said stages of said second register providing said further interrupt signals to said system bus for transmission to said further interrupt signal inputs, respectively, of said first processor.

6. The apparatus of claim 5 in which said first processor includes means for generating and transmitting on said system bus a second type of instruction having an address portion containing an address representative of said second processor.

7. The apparatus of claim 6 in which said second type of instruction comprises an input/output read instruction, and said converting means includes third decoding means responsive to said input/output read instruction for controlling placing of said outputs of said stages of said second register onto said system bus for transmission to said first processor when said means in said first processor transmits, on said system bus, said input/output read instruction having said address portion containing said address representative of said second processor.

8. A method for transmitting a plurality of control signals from a first digital processor to a second digital processor, said first and second digital processors being coupled to a system bus for communication therebetween, said second processor being coupled to said system bus through converting means, said second digital processor having an address associated therewith and a plurality of control signal inputs corresponding to said plurality of control signals, respectively, said plurality of control signals including a predetermined control signal, said plurality of control signal inputs including a predetermined control signal input corresponding to said predetermined control signal, comprising the steps:

generating and transmitting, by means in said first processor, a first type of instruction having an opcode portion, an address portion containing said address of said second processor and a data portion containing a data signal representative of said predetermined control signal, said transmitting of said first type of instruction by said means in said first processor occurring on said system bus, generating, by said converting means responsive to said first type of instruction, said predetermined control signal for transmission to said predetermined control signal input in response to said instruction, said address portion and said data signal, said generating and transmitting step comprising the step of generating and transmitting said first type of instruction having an address portion containing the address of said second processor and said data portion comprising a plurality of bits for designating said plurality of control signals, respectively, said step of generating said predetermined control signal comprising receiving said plurality of bits of said data portion into respective stages of a first register coupled to said system bus, and enabling said first register to store said data signal contained in said data portion when said first processor transmits said first type of instruction having said opcode portion designating said first type of instruction and said address portion containing said address of said second processor, and providing inputs, respectively, to said control inputs of said second processor from said stages of said first register.

9. The method of claim 8 wherein said plurality of control signals includes at least one interrupt signal and said plurality of control signal inputs includes at least one interrupt signal input to said second processor corresponding to said interrupt signal, said generating and transmitting step comprising the step of:

generating and transmitting an input/output write instruction having an address portion containing the address of said second processor and a data portion containing a data signal representative of said interrupt signal.

10. The method of claim 9 in which said converting means further comprises a second register having a plurality of stages and in which said method further comprises a step of:

generating and transmitting, by means in said second processor, an input/output write instruction having an address portion containing the address of said second register and a data portion containing a data signal comprising a plurality of bits designating a plurality of further interrupt signals, respectively.

11. The method of claim 10 in which said first processor includes a plurality of further interrupt signal inputs corresponding to said plurality of further interrupt signals, said method further including the steps of:

enabling said second register to store said data signal contained in said data portion of said input/output write instruction transmitted by said second processor when said input/output write instruction is transmitted by said second processor having said address portion containing said address of said second register, and providing said further interrupt signals to said system bus from said stages of said second register for transmission to said further interrupt signal inputs, respectively, of said first processor.

12. The method of claim 11 further including generating and transmitting on said system bus, by means in said first processor, a second type of instruction having an address portion containing an address representative of said second processor.

13. The method of claim 12 in which the step of generating and transmitting said second type of instruction on said system bus comprises generating and transmitting on said system bus an input/output read instruction having an address portion containing an address representative of said second processor, and further comprising placing said outputs of said stages of said second register onto said system bus for transmission to said first processor when said means in said first processor transmits, on said system bus said input/output read instruction having said address portion containing said address representative of said second processor.

* * * * *